(12) United States Patent
Huang

(10) Patent No.: US 12,733,774 B1
(45) Date of Patent: Sep. 15, 2026

(54) STRAW HOLDER CONFIGURED FOR MOUNTING ON WALL

(71) Applicant: Manjuan Huang, Shenzhen (CN)

(72) Inventor: Manjuan Huang, Shenzhen (CN)

( * ) Notice: Subject to any disclaimer, the term of this patent is extended or adjusted under 35 U.S.C. 154(b) by 0 days.

(21) Appl. No.: 19/321,513

(22) Filed: Sep. 8, 2025

Related U.S. Application Data

(63) Continuation-in-part of application No. 30/003,587, filed on May 14, 2025.

(51) Int. Cl.
*A47J 47/16* (2006.01)

(52) U.S. Cl.
CPC .................................... *A47J 47/16* (2013.01)

(58) Field of Classification Search
CPC . A47J 47/16; A47J 47/20; E03C 1/186; E03C 1/181; A47F 5/0807; A47F 7/0028; A47F 7/0021; A47B 25/28; A47B 81/005; A61M 5/008; A47G 21/184
See application file for complete search history.

(56) References Cited

U.S. PATENT DOCUMENTS 239,874 A * 4/1881 Southwood ............ A47G 25/12 224/29.5
2,981,030 A * 4/1961 Knop ..................... A47B 97/08 211/74
4,799,744 A * 1/1989 Toy ........................ A47J 47/16 211/184
5,128,105 A * 7/1992 Berthold ................... B01L 9/06 422/65
6,123,197 A * 9/2000 Marquez ................ A47F 13/00 206/575
6,698,589 B1 * 3/2004 Johnson ............... A47B 81/005 206/391
6,850,208 B1 * 2/2005 Ferrante ................ A47F 7/0028 40/725
7,007,808 B2 3/2006 Morgan
7,537,125 B2 * 5/2009 Plouchart ................ B25H 3/04 211/198
9,155,427 B1 10/2015 Kumar
10,905,212 B2 2/2021 Song
10,932,647 B1 * 3/2021 Audibert .............. A47L 15/505
10,974,890 B1 * 4/2021 Wagner .................. B65H 35/04
11,786,907 B2 * 10/2023 Sedlak ...................... B01L 9/06 211/71.01
11,857,119 B2 * 1/2024 Detlaff .................... A47J 47/20
2012/0117725 A1 * 5/2012 Presnell ................. E03C 1/186 4/654
2013/0326807 A1 12/2013 Ahn (Continued)

FOREIGN PATENT DOCUMENTS

DE 202019104788 U1 * 9/2019 .......... A47L 15/505

*Primary Examiner* — Ko H Chan

(57) ABSTRACT

A straw holder configured for mounting on a wall includes: a lower support frame and an upper sleeve frame. The lower support frame defines a receiving chamber having a top opening and a support surface. The upper sleeve frame defines a receiving chamber having an upper opening and a lower opening. The upper sleeve frame is arranged above the lower support frame, and the orthographic projection of the lower opening on the top surface of the lower support frame at least partially overlaps with the top opening, so as to achieve good storage of the straws.

12 Claims, 12 Drawing Sheets

(56) References Cited

U.S. PATENT DOCUMENTS

| | | | | |
|---|---|---|---|---|
| 2015/0136718 | A1* | 5/2015 | Sabounjian | A47B 88/994 211/85.4 |
| 2019/0038110 | A1* | 2/2019 | Manooki | A47B 81/04 |
| 2020/0237181 | A1* | 7/2020 | Campbell | A47L 15/505 |
| 2021/0113003 | A1* | 4/2021 | O'Cone | B23B 35/00 |
| 2023/0380636 | A1* | 11/2023 | Warren, V | A47F 7/0028 |

* cited by examiner

STRAW HOLDER CONFIGURED FOR MOUNTING ON WALL

CROSS REFERENCE TO RELATED APPLICATIONS

This application claims priority benefits to U.S. patent application Ser. No. 30/003,587, filed on May 14, 2025, the contents of which are incorporated herein by reference.

TECHNICAL FIELD

The present disclosure relates to a holder, and in particular, relates to a straw holder configured for mounting on a wall.

BACKGROUND

Current straw holders typically feature a one-piece cup-shaped design, where straws are stored by inserting them into the holder.

SUMMARY

The first aspect of the embodiments of the present disclosure provides a straw holder configured for mounting on a wall. The straw holder includes a lower support frame defining a mounting end surface, a top surface, and a bottom surface; the top surface and the bottom surface defining a height of the lower support frame; the mounting end surface configured to be connected to the wall; the lower support frame defining at least one accommodating chamber, wherein the at least one accommodating chamber defining a top opening and a support surface; and the top surface defining the top opening; and an upper sleeve frame defining a connecting end surface, an upper end surface, and a lower end surface; the upper end surface and lower end surface defining a height of the upper sleeve frame; the connecting end surface configured to be connected to the wall; the upper sleeve frame defining at least one receiving chamber, the at least one receiving chamber defining an upper opening and a lower opening; the upper end surface defining the upper opening, and the lower end surface defining the lower opening. The upper sleeve frame is arranged above the lower support frame, and an orthographic projection of the lower opening on the top surface of the lower support frame at least partially overlaps with the top opening.

The second aspect of the present disclosure provides a straw holder configured for mounting on a wall. The straw holder includes: a lower support frame defining at least one accommodating chamber, the at least one accommodating chamber defining a top opening and a support surface; and an upper sleeve frame defining at least one receiving chamber, the at least one receiving chamber defining an upper opening and a lower opening. The straw holder is adjustable in a manner that in a first state of the straw holder, a gap exists between a bottom surface of the upper sleeve frame and a top surface of the lower support frame, and in a second state of the straw holder, the bottom surface of the upper sleeve frame and the top surface of the lower support frame abut against each other.

BRIEF DESCRIPTION OF THE DRAWINGS

The description and drawings that constitute part of the present disclosure are provided for a further understanding of the present disclosure. The illustrative embodiments and their descriptions are provided for explanation but do not constitute improper limitations on the present disclosure.

DETAILED WAY

Figure 1:
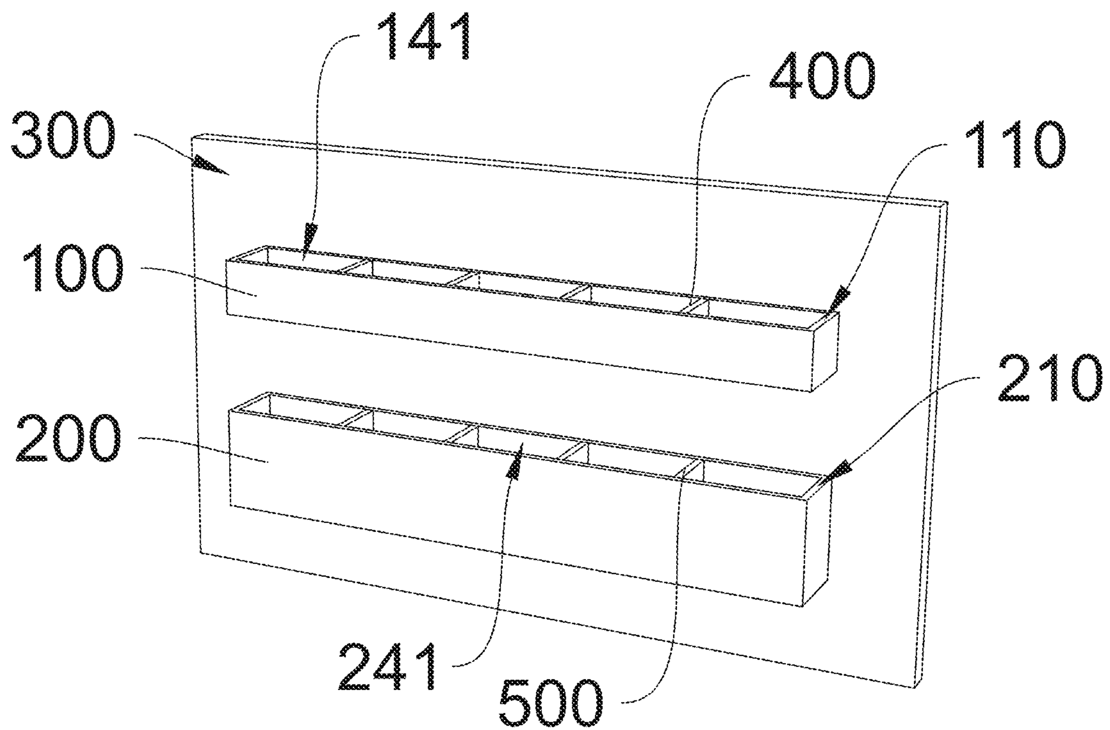
FIG. 1 is a perspective view of an installed straw holder according to some embodiments of the present disclosure.

The present disclosure will be described in detail below with reference to the accompanying drawings and in conjunction with various embodiments. Each example is provided to explain but not limit the present disclosure. In fact, it will be clear to those of ordinary skill that modifications and variations may be made without departing from the scope or spirit of the present disclosure. For example, a feature shown or described as part of some embodiments may be used according to some embodiments to produce yet some embodiments. Therefore, it is intended that the present disclosure includes such modifications and variations within the scope of the appended claims and their equivalents.

In the description of the present disclosure, the terms “longitudinal”, “lateral”, “upper”, “lower”, “front”, “back”, “left”, “right”, “vertical”, “horizontal”, “top”, “bottom” and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms “connected”, “connecting” and “arranged” used in the present disclosure should be understood in a broad sense. For example, it may be a fixed connecting manner or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

The depth of the straw holder in the related art is not adjustable, making it incompatible with straws of varying lengths. When dealing with longer straws, the exposed ends tend to tilt chaotically and may even fall out. Conversely, with shorter straws, the tops remain concealed, making them difficult to retrieve and use. This issue urgently requires improvement.

The present disclosure provides a wall-mounted straw holder, including a lower support frame 200 and an upper sleeve frame 100.

In some embodiments, the wall surface 300 on which the straw holder is mounted may be a wall, cabinet wall, or other flat surfaces. The straw holder is used as an example to describe a design for storing straws. In some embodiments, the straw holder may also store other similar, elongated objects, such as chopsticks, knives and forks.

In some embodiments, as shown in FIGS. 1-7, the lower support frame 200 defines a mounting end surface 230, a top surface 210, and a bottom surface 220. The top surface 210 and the bottom surface 220 of the lower support frame 200 define the height of the lower support frame 200. The mounting end surface 230 of the lower support frame 200 is configured to be connected to the wall surface 300, facilitating mounting of the lower support frame 200. The lower support frame 200 defines at least one accommodating chamber 240, which has a top opening 241 and a support surface 242. The top surface 210 of the lower support frame 200 defines the top opening 241 of the at least one accommodating chamber 240. The bottom of the straw may be inserted into one of the at least one accommodating chamber 240 via the top opening 241 and abut against the support surface 242. In this way, the lower support frame 200 supports the bottom of the straw. The upper sleeve frame 100 defines a connecting end surface 130, an upper end surface 110, and a lower end surface 120. The upper end surface 110 and the lower end surface 120 define the height of the upper sleeve frame 100. The connecting end surface 130 is configured to be connected to the wall surface 300, facilitating installation of the upper sleeve frame 100. The upper sleeve frame 100 defines at least one receiving chamber 140, which has an upper opening 141 and a lower opening 142. The upper end surface 110 defines the upper opening 141, and the lower end surface 120 defines the lower opening 142. The straw may pass through the upper opening 141 into the at least one receiving chamber 140 and out through the lower opening 142. Thus, the upper sleeve frame 100 may be positioned around the straw to restrict the portion of the straw exposed from the accommodating chamber 240.

In some embodiments, the upper sleeve frame 100 is positioned above the lower support frame 200, and the orthographic projection of the lower opening 142 on the top surface 210 of the lower support frame 200 at least partially overlaps with the top opening 241. In this configuration, when using the upper sleeve frame 100 and lower support frame 200, the straw may pass through the upper opening 141 into the at least one receiving chamber 140 and out through the lower opening 142. The straw may then be inserted through the top opening 241 into the accommodating chamber 240, where it rests against the support surface 242. The bottom of the straw may be accommodated within the accommodating chamber 240, while the upper sleeve frame 100 may restrict the portion of the straw exposed from the accommodating chamber 240, allowing the upper portion of the straw to be nestled within the at least one receiving chamber 140, effectively storing the straw.

As there is no mechanical connection between the lower support frame 200 and the upper sleeve frame 100 of the straw holder—adopting a split design—users can adjust the relative installation position of the lower support frame 200 and the upper sleeve frame 100 according to their needs. Users may pair the relative distance between the lower support frame 200 and the upper sleeve frame 100 based on the length of the straws to be stored, ensuring an appropriate exposed length of the straw ends. This design not only reduces clutter caused by excessively long exposed straw ends but also avoids difficulty in retrieving straws due to insufficient or no exposure. Ultimately, it ensures effective and practical storage of the straws.

Figure 3:
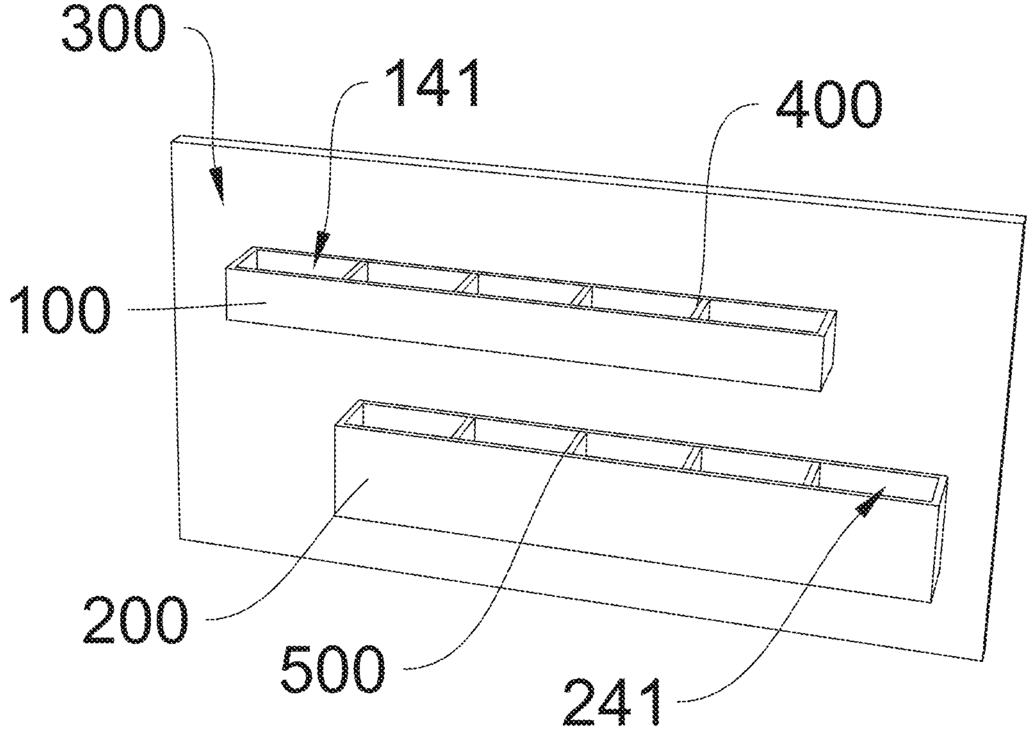
FIG. 3 is a perspective view of an installed straw holder according to some embodiments of the present disclosure.
Figure 4:
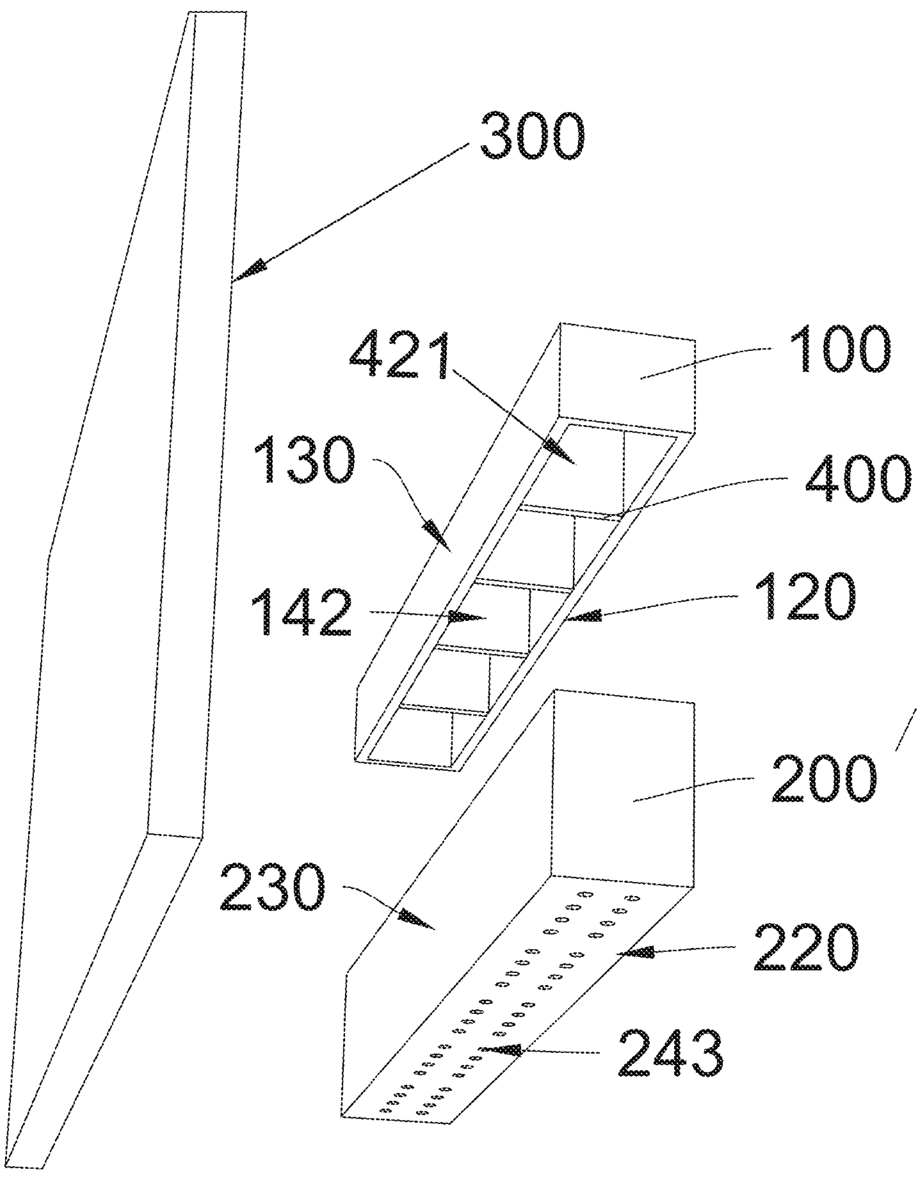
FIG. 4 is an exploded view of a straw holder and a wall according to some embodiments of the present disclosure.
Figure 5:
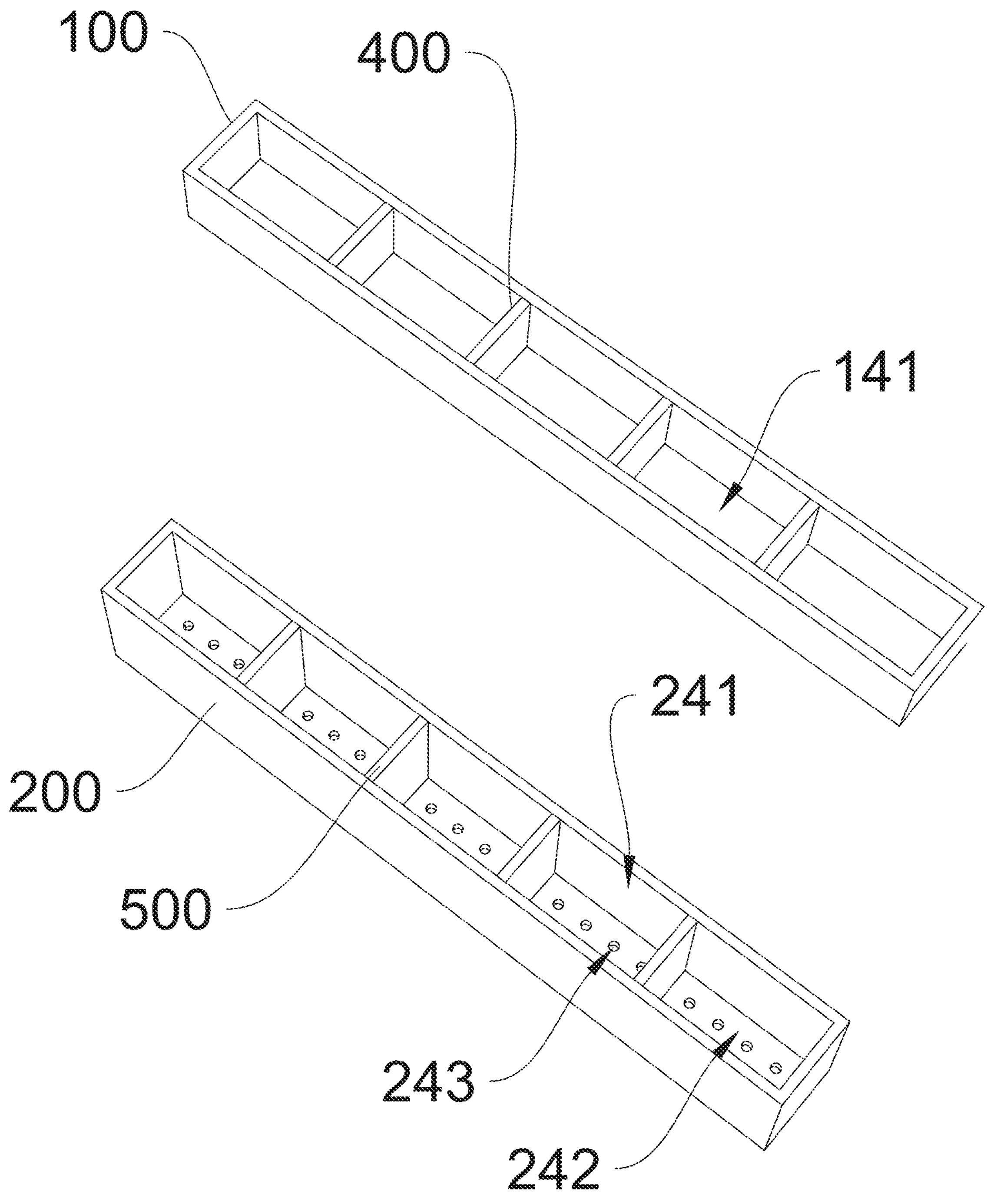
FIG. 5 is a perspective view of an upper sleeve and a lower support frame of a straw holder according to some embodiments of the present disclosure.
Figure 6:
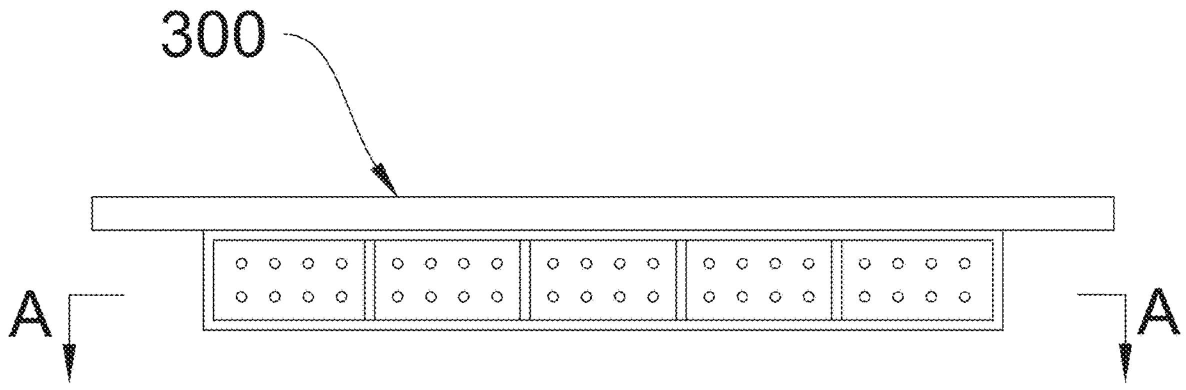
FIG. 6 is a perspective view of a straw holder according to some embodiments of the present disclosure.
Figure 7:
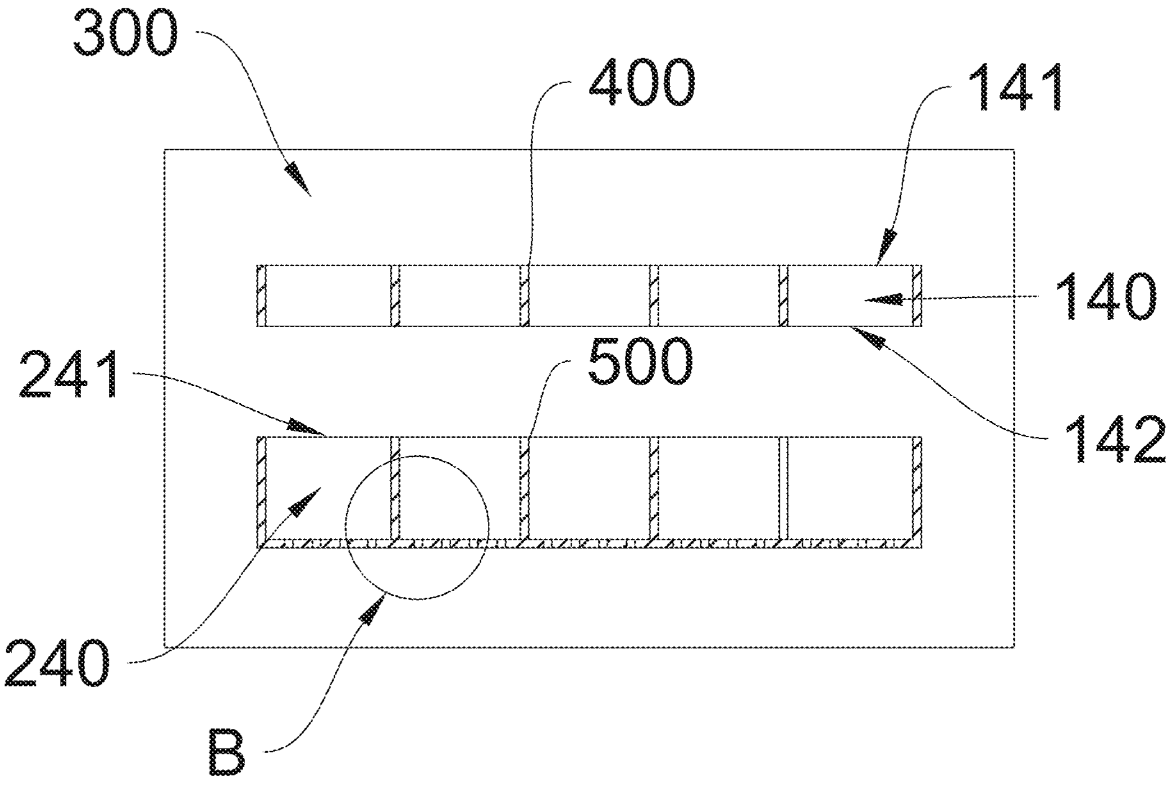
FIG. 7 is a cross-sectional view taken along line A-A of FIG. 6.
Figure 8:
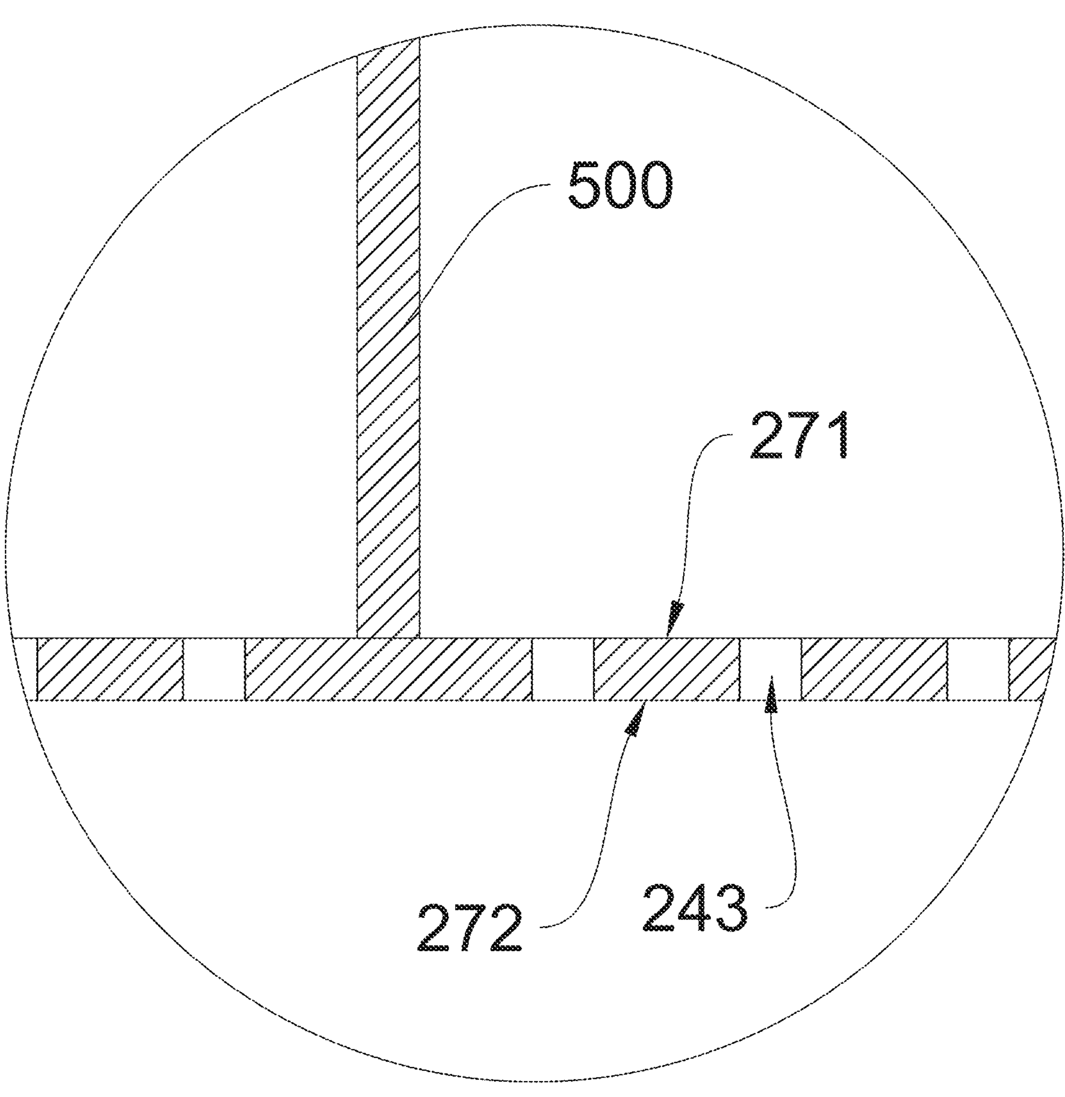
FIG. 8 is an enlarged perspective view of area B of FIG. 7.
Figure 9:
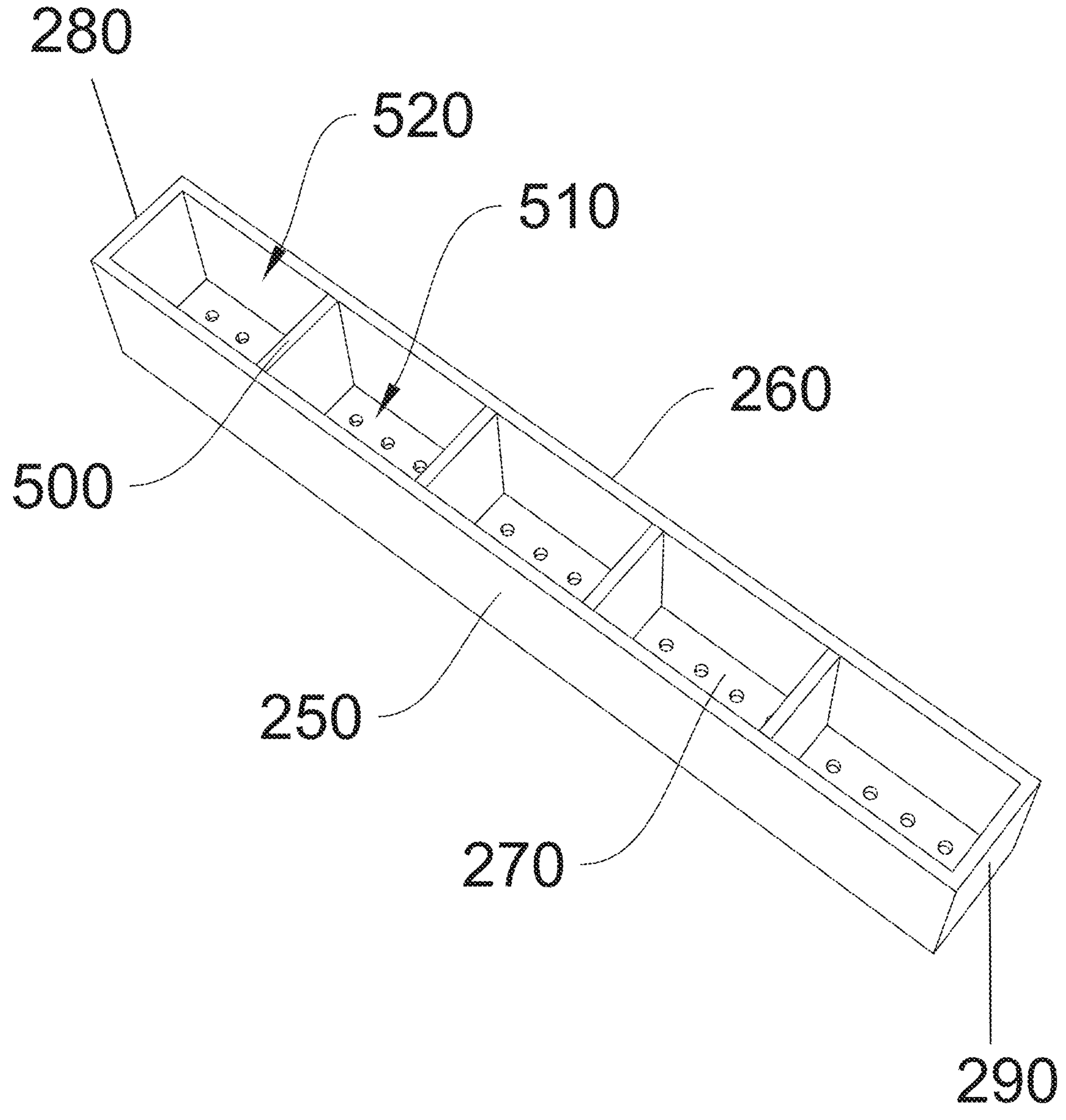
FIG. 9 is a perspective view of a lower support frame of a straw holder according to some embodiments of the present disclosure.
Figure 10:
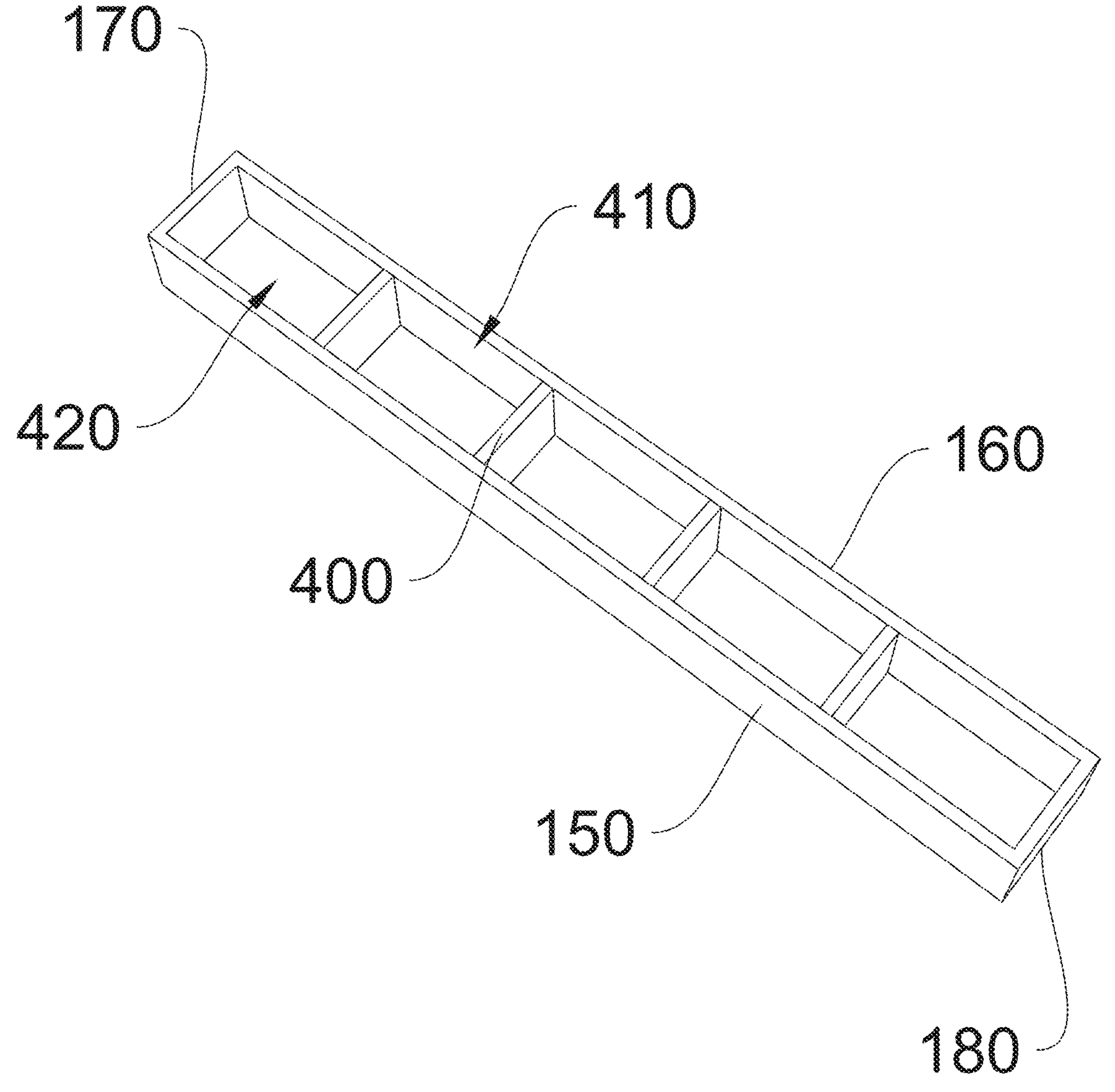
FIG. 10 is a perspective view of an upper sleeve frame of a straw holder according to some embodiments of the present disclosure.

In some embodiments, the upper sleeve frame 100 is positioned directly above the lower support frame 200, facilitating the placement of straws. In some embodiments, as shown in FIG. 3, the user may also stagger the lower support frame 200 with the upper sleeve frame 100. By adjusting the left-right offset direction and distance between the lower support frame 200 and the upper sleeve frame 100, the straws' tilt and angle within the straw holder may be adjusted, further facilitating access. In short, the split design of the straw holder allows for more flexible installation of the lower support frame 200 and upper sleeve frame 100, allowing users to customize their setup based on their preferences and usage scenarios, resulting in a better straw storage experience.

When the lower support frame 200 and upper sleeve frame 100 are staggered, the upper sleeve frame 100 and lower support frame 200 partially overlap vertically. In this case, the portion of the lower support frame 200 that does not overlap with the upper sleeve frame 100 may be used as a separate storage area, capable of accommodating straws whose length is slightly greater than the depth of the accommodating chamber 240. However, straws whose length exceeds the height defined by the support surface 242 of the lower support frame 200 and the upper end surface 110 of the upper sleeve frame 100 still require the upper sleeve frame 100 and the lower support frame 200 to be cooperated. Staggering the lower support frame 200 and the upper sleeve frame 100 provides more diverse straw storage options.

Figure 2:
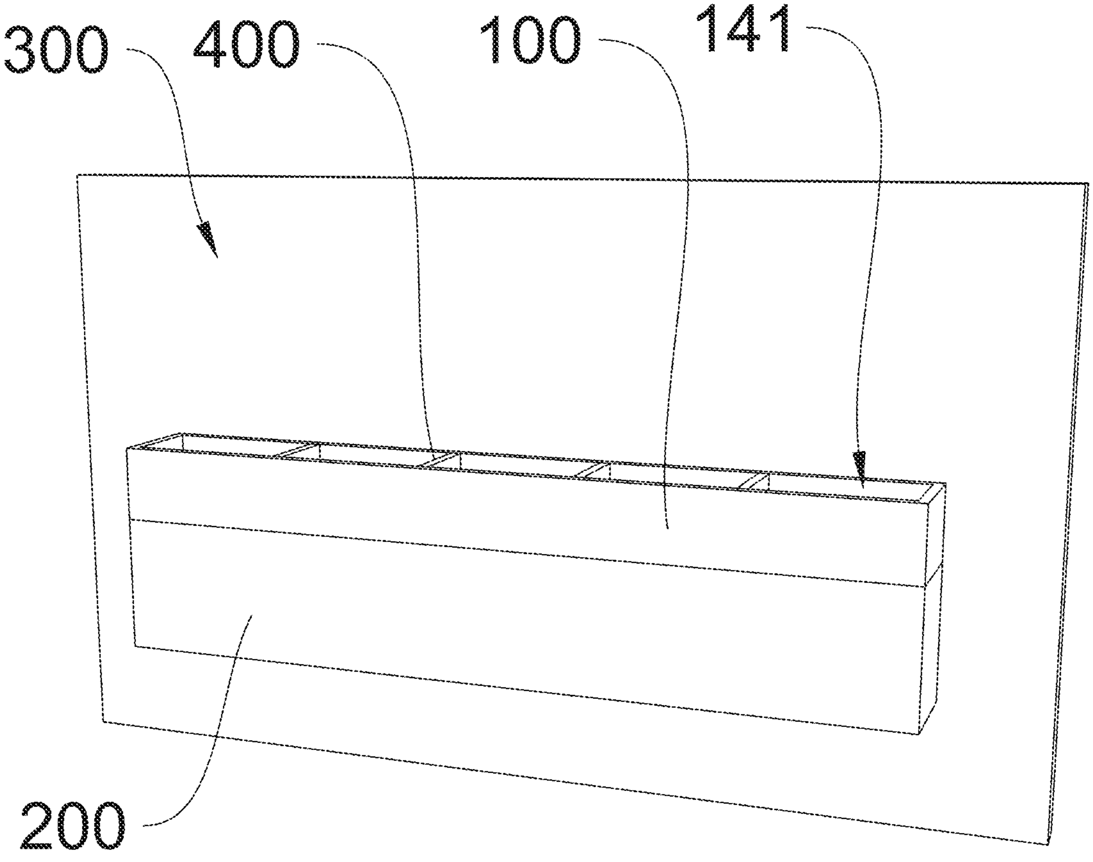
FIG. 2 is a perspective view of an installed straw holder according to some embodiments of the present disclosure.

In some embodiments, as shown in FIG. 1, when a gap exists between the upper sleeve frame 100 and the lower support frame 200 (i.e., between the top surface 210 and the lower end surface 120), air may flow through the gap, facilitating the drying of the straws within the straw holder. This reduces odors caused by residual water stains within the straw holder and enhances user experience. As shown in FIG. 2, in some embodiments, the upper sleeve frame 100 and the lower support frame 200 may also be positioned to abut against each other. In this case, there is no gap between the upper sleeve frame 100 and the lower support frame 200 (i.e., between the top surface 210 and the lower end surface 120), reducing the occurrences of dust from entering the straw holder through the gap between the upper sleeve frame 100 and the lower support frame 200, thereby reducing dust contamination of the straws.

In some embodiments, as shown in FIGS. 5-12, the lower support frame 200 includes a first front wall 250, a first rear wall 260, a first bottom wall 270, a first sidewall 280, and a second sidewall 290. The first front wall 250 and the first rear wall 260 define the width of the lower support frame 200. The first sidewall 280 and the second sidewall 290 extend between the first front wall 250 and the first rear wall 260, and define the length of the lower support frame 200. The first bottom wall 270 is connected to the first front wall 250, the first rear wall 260, the first sidewall 280, and the second sidewall 290. The first bottom wall 270 defines an inner surface 271 and an outer surface 272. The inner surface 271 of the first bottom wall 270 is coplanar with the support surface 242 of the accommodating chamber 240, while the outer surface 272 of the first bottom wall 270 is coplanar with the bottom surface 220 of the lower support frame 200.

In some embodiments, the first bottom wall 270 defines a plurality of drainage holes 243. Each drainage hole 243 extends from the inner surface 271 to the outer surface 272 of the first bottom wall 270, that is, each drainage hole 243 runs through the support surface 242 of the accommodating chamber 240 and the bottom surface 220 of the lower support frame 200. When storing straws, the residual water on the straws may flow into the lower support frame 200 and drain through the drainage holes 243 in the first bottom wall 270, reducing water from accumulating within the accommodating chamber 240 of the lower support frame 200 and ensuring the dryness and hygiene of the straw holder.

In some embodiments, as shown in FIGS. 4 and 7-10, the upper sleeve frame 100 includes a second front wall 150, a second rear wall 160, a third sidewall 170, and a fourth sidewall 180. The second front wall 150 and the second rear wall 160 define the width of the upper sleeve frame 100. The third sidewalls 170 and the fourth sidewall 180 extend between the second front wall 150 and the second rear wall 160 and define the length of the upper sleeve frame 100.

In some embodiments, the upper sleeve frame 100 and the lower support frame 200 have the same shape, and the lower support frame 200 has the same length and width as the upper sleeve frame 100. The unified design and specifications of the upper sleeve frame 100 and the lower support frame 200 make the overall holder more harmonious and aesthetically pleasing.

In some embodiments, the upper sleeve frame 100 also includes at least one upper partition 400. The at least one upper partition 400 is positioned within the at least one receiving chamber 140 and divides the at least one receiving chamber 140 into plurality of sub-receiving chambers 410. The upper edge of the at least one upper partition 400 divides the upper opening 141 into a plurality of upper insertion openings 420. The lower edge of the at least one upper partition 400 divides the lower opening 142 into a plurality of lower insertion openings 421. A straw may be passed through one upper insertion opening 420 and one lower insertion opening 421 of a sub-receiving chamber 410, and then inserted into and accommodated in the accommodating chamber 240.

In some embodiments, the plurality of sub-receiving chambers 410 allows users to categorize and organize straws, making straw storage more organized and enhancing user experience.

In some embodiments, the at least one upper partition 400 is arranged parallel to the third sidewall 170 or the fourth sidewall 180 and extends from the second front wall 150 to the second rear wall 160, effectively dividing the at least one receiving chamber 140 and improving user experience.

In some embodiments, the top opening 241 of the accommodating chamber 240 is the same size as the upper opening 141 and the lower opening 142 of the at least one receiving chamber 140, ensuring that each section of the holder provides equal storage space for straws, achieving excellent storage efficiency.

In some embodiments, the lower support frame 200 also includes at least one lower partition 500. The at least one lower partition 500 is positioned within the accommodating chamber 240 and divides the accommodating chamber 240 into plurality of sub-accommodating chambers 510. The upper edge of the at least one lower partition 500 divides the top opening 241 into a plurality of top insertion openings 520, through which straws may be inserted and placed in the sub-accommodating chambers 510. The top insertion openings 520 of the lower support frame 200 correspond one-to-one with the lower insertion openings 421 of the upper sleeve frame 100 and are of equal size. This allows straws passing through the sub-receiving chambers 410 to be placed in their corresponding sub-accommodating chambers 510, achieving effective classification and storage. In some embodiments, the mounting end surface 230 of the lower support frame 200 and the connecting end surface 130 of the upper sleeve frame 100 are both adhered to the wall surface 300 by using adhesive. This allows for quick installation of the holder without the need of drilling holes or installing other mounting structures in the wall surface 300, providing greater flexibility in installation locations and simplifying installation process. In some embodiments, the lower support frame 200 and upper sleeve frame 100 may also be attached to the wall surface 300 using other structures, such as screws, to achieve a more secure installation.

In some embodiments, both the lower support frame 200 and upper sleeve frame 100 are made of plastic, which offers advantages such as low cost, resistance to mold, light weight, and a wide variety of colors. In some embodiments, the lower support frame 200 and the upper sleeve frame 100 may also be made of other materials, such as wood or bamboo, to achieve different textures.

Figure 11:
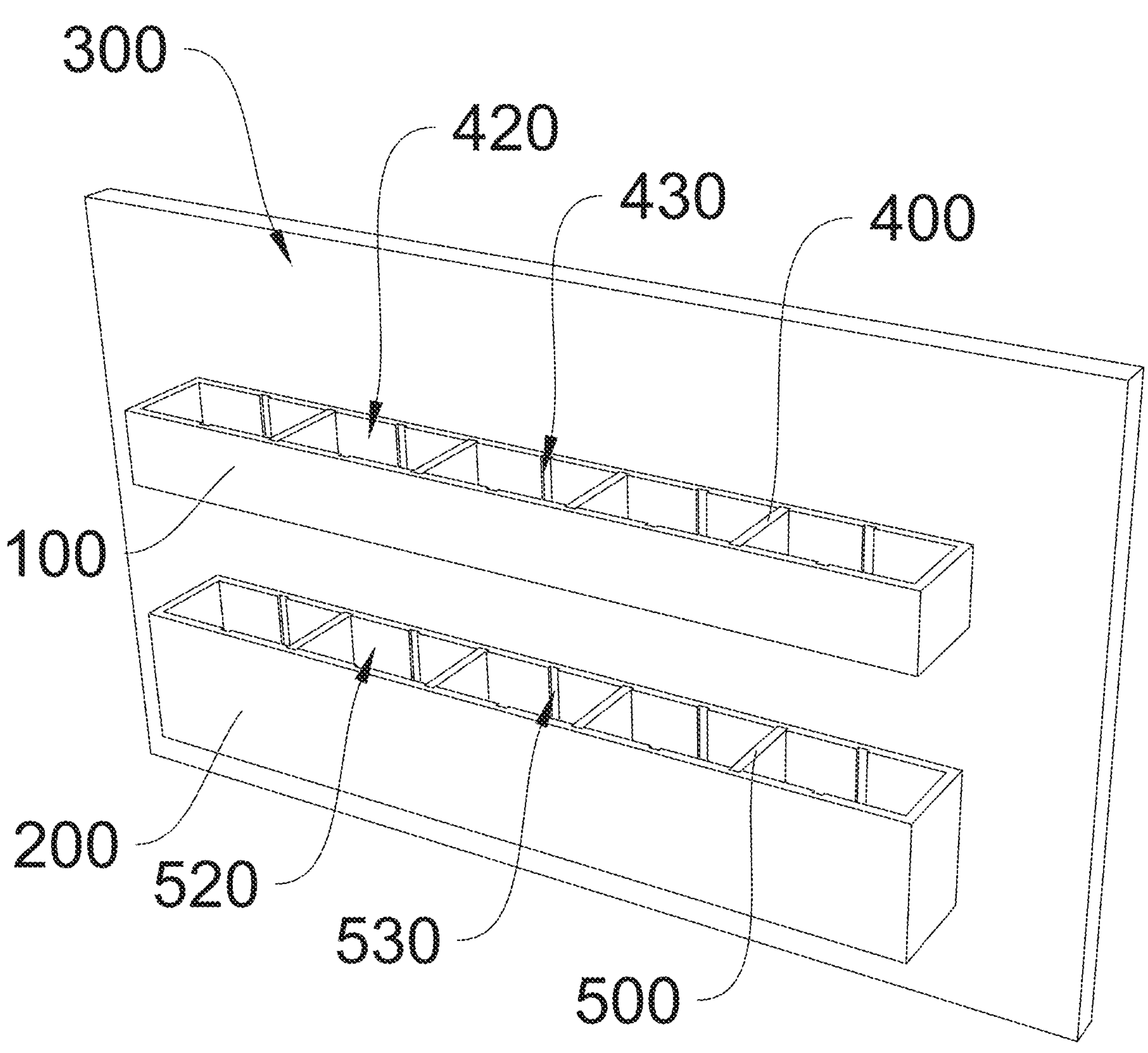
FIG. 11 is a perspective view of an installed straw holder according to some embodiments of the present disclosure.
Figure 12:
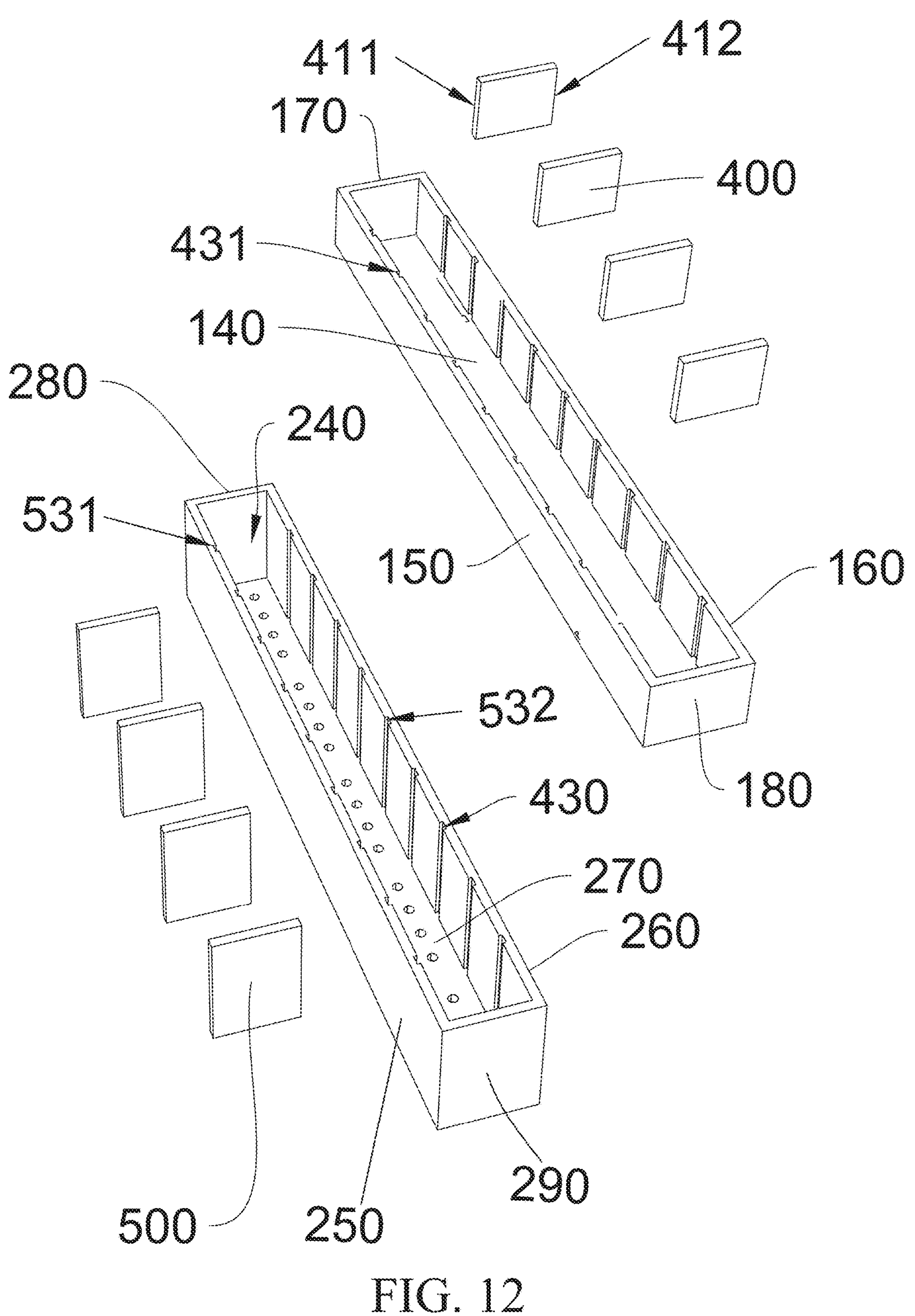
FIG. 12 is an exploded view of a straw holder according to some embodiments of the present disclosure.

In some embodiments, as shown in FIGS. 11-12, the inner sidewalls of the at least one receiving chamber 140 defines a plurality of pairs of upper slots 430. The plurality of pairs of upper slots 430 are spaced apart between the third sidewall 170 and the fourth sidewall 180. The number of pairs of upper slots 430 is greater than or equal to the number of upper partitions 400. An upper partition 400 may be selectively connected to a pair of upper slots 430 and secured within the at least one receiving chamber 140. Users may select the number and location of upper partitions 400 as needed. By adjusting the location and number of upper partitions 400, the size, shape, and number of sub-receiving chambers 410 may be adjusted to achieve diverse storage layouts, enhancing the versatility of the holder and thus meeting the diverse needs of different users.

In some embodiments, each pair of upper slots 430 includes a first engaging slot 431 and a second engaging slot 432. The first engaging slot 431 is arranged on the inner side of the second front wall 150, and the second engaging slot 432 is arranged on the inner side of the second rear wall 160. The upper partition 400 has a front sidewall 411 and a rear sidewall 412. When one upper partition 400 is inserted into a pair of upper slots 430, the front sidewall 411 of this upper partition 400 is engaged with the first engaging slot 431, and the rear sidewall 412 of this upper partition 400 is engaged with the second engaging slot 432, thereby achieving a good insertion and fixing effect.

In some embodiments, the inner side of the accommodating chamber 240 defines a plurality of pairs of lower slots 530. The plurality of pairs of lower slots 530 are spaced apart between the first sidewall 280 and the second sidewall 290. The number of pairs of lower slots 530 is greater than or equal to the number of lower partitions 500. One lower partition 500 may be selectively inserted into a pair of lower slots 530 and secured within the accommodating chamber 240. The user may select the number and installation location of the lower partitions 500 according to their needs. In some embodiments, each pair of lower slots 530 includes a third engaging slot 531 and a fourth engaging slot 532. The third engaging slot 531 is arranged on the inner side of the first front wall 250, and the fourth engaging slot 532 is arranged on the inner side of the first rear wall 260. When one lower partition 500 is inserted into a pair of lower slots 530, one end of this lower partition 500 is engaged with the third engaging slot 531, and the other end of this lower partition 500 is engaged with the fourth engaging slot 532, thereby achieving a secure connection.

In some embodiments, the number of lower partitions 500 is the same as the number of upper partitions 400, and the projection of the sub-receiving chambers 410 formed by the upper sleeve frame 100 on the top surface 210 of the lower support frame 200 completely overlaps with the top insertion openings 520 of the sub-accommodating chamber 510. Maintaining the consistent layout of the upper sleeve frame 100 and the lower support frame 200 facilitates the insertion of straws through the sub-receiving chambers 410 and into the sub-accommodating chambers 510, further facilitating the classification and storage of straws on the straw holder.

From the above description, it may be seen that the above-described embodiments of the present disclosure achieve the following technical effects.

Since the lower support frame 200 and the upper sleeve frame 100 of the straw holder are not mechanically connected and are designed as separate units, the user may adjust the relative installation position of the lower support frame 200 and the upper sleeve frame 100 according to their needs. The user may adjust the relative distance between the lower support frame 200 and the upper sleeve frame 100 based on the length of the straws, ensuring that the upper ends of the straws are exposed to the appropriate length. This reduces the appearance of excessively exposed straw ends, which may make them cluttered, and also reduces the inconvenience of removing or using straws due to the exposed upper ends being too short or not exposed, ensuring optimal straw storage.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A straw holder configured for mounting on a wall, comprising:

a lower support frame defining a mounting end surface, a top surface, and a bottom surface; a distance between the top surface and the bottom surface defining a height of the lower support frame; the mounting end surface configured to be connected to the wall; the lower support frame defining at least one accommodating chamber, the at least one accommodating chamber defining a top opening and a support surface; and the top surface defining the top opening; and an upper sleeve frame defining a connecting end surface, an upper end surface, and a lower end surface; a distance between the upper end surface and lower end surface defining a height of the upper sleeve frame; the connecting end surface configured to be connected to the wall; the upper sleeve frame defining at least one receiving chamber, the at least one receiving chamber defining an upper opening and a lower opening; the upper end surface defining the upper opening, and the lower end surface defining the lower opening;

wherein the upper sleeve frame is arranged above the lower support frame, and an orthographic projection of the lower opening on the top surface of the lower support frame at least partially overlaps with the top opening;

wherein the upper sleeve frame comprises at least one upper partition, the at least one upper partition is disposed within the at least one receiving chamber and divides the at least one receiving chamber into a plurality of sub-receiving chambers, an upper edge of the at least one upper partition divides the upper opening into a plurality of upper insertion openings configured for straws to pass into the sub-receiving chambers;

wherein the at least one upper partition is disposed parallel to the third sidewall or the fourth sidewall and extends from the second front wall to the second rear wall.

2. The straw holder according to claim 1, wherein the lower support frame comprises: a first front wall, a first rear wall, a first bottom wall, a first sidewall, and a second sidewall;

a distance between the first front wall and the first rear wall defines a width of the lower support frame; the first sidewall and the second sidewall extend between the first front wall and the first rear wall, and a distance between the first sidewall and the second sidewall defines a length of the lower support frame; the first bottom wall is connected to the first front wall, the first rear wall, the first sidewall, and the second sidewall; the first bottom wall defines an inner surface and an outer surface, and the outer surface of the first bottom wall is the bottom surface of the lower support frame.

3. The straw holder according to claim 2, wherein the first bottom wall defines a plurality of drainage holes, each of the plurality of drainage holes extends from the inner surface to the outer surface of the first bottom wall.

4. The straw holder according to claim 3, wherein the lower support frame further comprises at least one lower partition, the at least one lower partition is disposed within the accommodating chamber and divides the accommodating chamber into a plurality of sub-accommodating chambers, an upper edge of the at least one lower partition divides the top opening into a plurality of top insertion openings configured for the straws to pass into the sub-receiving chambers.

5. The straw holder according to claim 2, wherein the upper sleeve frame comprises: a second front wall, a second rear wall, a third sidewall, and a fourth sidewall;

a distance between the second front wall and the second rear wall defines a width of the upper sleeve frame, the third sidewall and the fourth sidewall extend between the second front wall and the second rear wall, and a distance between the third sidewall and the fourth sidewall defines a length of the upper sleeve frame.

6. The straw holder according to claim 5, wherein the length of the lower support frame is the same as the length of the upper sleeve frame, and the width of the lower support frame is the same as the width of the upper sleeve frame.

7. The straw holder according to claim 1, wherein the mounting end surface of the lower support frame and the connecting end surface of the upper sleeve frame are both configured to be adhered to the wall by adhesive.

8. The straw holder according to claim 1, wherein the lower support frame is made of plastic, wood, or bamboo.

9. The straw holder according to claim 1, wherein the upper sleeve frame is made of plastic, wood, or bamboo.

10. A straw holder configured for mounting on a wall, comprising:

a lower support frame defining at least one accommodating chamber, the at least one accommodating chamber defining a top opening and a support surface; and an upper sleeve frame defining at least one receiving chamber, the at least one receiving chamber defining an upper opening and a lower opening;

wherein the straw holder is adjustable in a manner that in a first state of the straw holder, a gap exists between a bottom surface of the upper sleeve frame and a top surface of the lower support frame, and in a second state of the straw holder, the bottom surface of the upper sleeve frame and the top surface of the lower support frame abut against each other;

wherein the lower support frame comprises a first bottom wall, and the first bottom wall defines a plurality of drainage holes.

11. The straw holder according to claim 10, wherein the lower support frame further comprises at least one lower partition, the at least one lower partition is disposed within the accommodating chamber and divides the accommodating chamber into a plurality of sub-accommodating chambers, an upper edge of the at least one lower partition divides the top opening into a plurality of top insertion openings.

12. A straw holder configured for mounting on a wall, comprising:

a lower support frame defining at least one accommodating chamber, the at least one accommodating chamber defining a top opening and a support surface; and an upper sleeve frame defining at least one receiving chamber, the at least one receiving chamber defining an upper opening and a lower opening;

wherein the straw holder is adjustable in a manner that in a first state of the straw holder, a gap exists between a bottom surface of the upper sleeve frame and a top surface of the lower support frame, and in a second state of the straw holder, the bottom surface of the upper sleeve frame and the top surface of the lower support frame abut against each other;

wherein the upper sleeve frame further comprises at least one upper partition, the at least one upper partition is disposed within the at least one receiving chamber and divides the at least one receiving chamber into a plurality of sub-receiving chambers, an upper edge of the at least one upper partition divides the upper opening into a plurality of upper insertion openings.

* * * * *